(12) United States Patent
De Mazière

(10) Patent No.: US 7,478,718 B2
(45) Date of Patent: *Jan. 20, 2009

(54) WET CLUTCH, IN PARTICULAR DCT CLUTCH

(75) Inventor: Filip De Mazière, Heusden-Destelbergen (BE)

(73) Assignee: Hoerbiger Antribstechnik GmbH, Schongau (DE)

( * ) Notice: Subject to any disclaimer, the term of this patent is extended or adjusted under 35 U.S.C. 154(b) by 75 days.

This patent is subject to a terminal disclaimer.

(21) Appl. No.: 11/212,472

(22) Filed: Aug. 25, 2005

(65) Prior Publication Data

US 2006/0042904 A1 Mar. 2, 2006

(30) Foreign Application Priority Data

Aug. 26, 2004 (EP) .................................. 04020301

(51) Int. Cl.
*F16D 25/12* (2006.01)
(52) U.S. Cl. ............. 192/87.15; 192/70.28; 192/106 F
(58) Field of Classification Search ............... 192/70.28
See application file for complete search history.

(56) References Cited

U.S. PATENT DOCUMENTS

| 2,534,034 | A |  | 12/1950 | Brie |  |
|---|---|---|---|---|---|
| 3,063,529 | A |  | 11/1962 | Cook |  |
| 3,424,033 | A |  | 1/1969 | Croswhite |  |
| 4,250,984 | A |  | 2/1981 | Hoyler et al. |  |
| 4,645,049 | A |  | 2/1987 | Matsuda et al. |  |
| 4,683,997 | A | * | 8/1987 | Stockmar et al. | 192/70.28 |
| 4,732,253 | A |  | 3/1988 | Yoshimasa et al. |  |
| 4,741,422 | A |  | 5/1988 | Fuehrer et al. |  |
| 4,802,564 | A | * | 2/1989 | Stodt | 192/70.28 |
| 4,844,219 | A | * | 7/1989 | Stockmar | 192/70.28 |
| 5,720,375 | A |  | 2/1998 | Maeda et al. |  |
| 6,026,944 | A | * | 2/2000 | Satou et al. | 192/70.28 |
| 6,247,569 | B1 |  | 6/2001 | McGuire |  |
| 6,523,657 | B1 | * | 2/2003 | Kundermann et al. | 192/48.8 |
| 6,929,107 | B2 |  | 8/2005 | Hegerath |  |
| 7,350,635 | B2 | * | 4/2008 | De Maziere | 192/87.15 |
| 2003/0085094 | A1 | * | 5/2003 | Miyoshi et al. | 192/70.12 |
| 2003/0116396 | A1 |  | 6/2003 | Kuhstrebe |  |
| 2006/0042909 | A1 |  | 3/2006 | De Maziere |  |

FOREIGN PATENT DOCUMENTS

DE 35 08 375 11/1985
DE 91 14 528 2/1992

(Continued)

OTHER PUBLICATIONS

European Search Report for co-pending application EP 04020301.0.

(Continued)

*Primary Examiner*—Rodney H Bonck
(74) *Attorney, Agent, or Firm*—Sheridan Ross P.C.

(57) ABSTRACT

Wet clutch (1), in particular DCT clutch, comprising:
at least one clutch pack (2, 3) including:
a plurality of steel plates (4, 5), and
a plurality of friction plates (6, 7) being disposed between the steel plates (4, 5); and at least one clutch piston (8, 9) acting on the clutch pack (2, 3), wherein disc springs (10, 11) are disposed between the steel plates (4, 5).

5 Claims, 2 Drawing Sheets

FOREIGN PATENT DOCUMENTS

Figure 1:
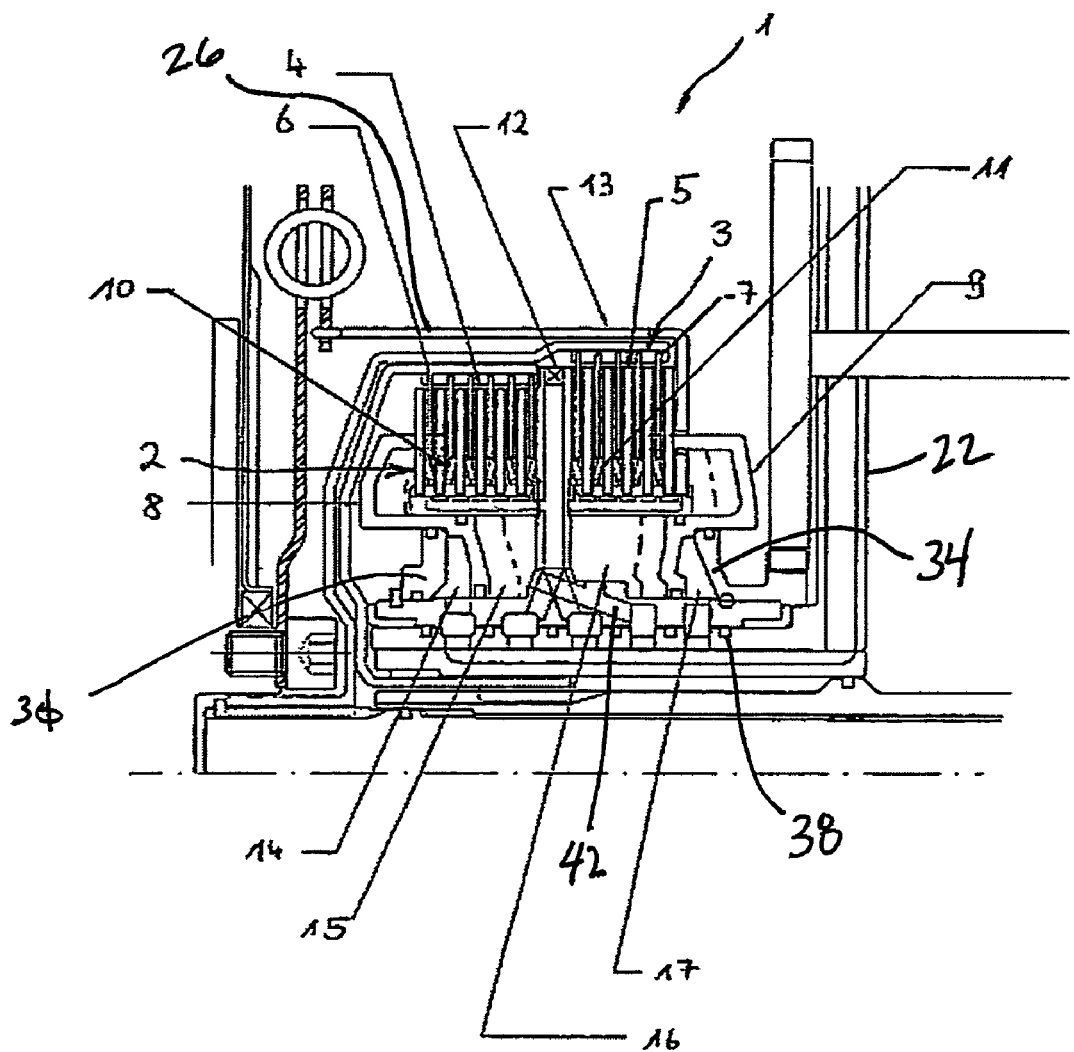

| | | |
|---|---|---|
| DE | 42 39 233 | 5/1994 |
| DE | 101 46 837 | 5/2002 |
| DE | 101 43 834 | 3/2003 |
| DE | 101 46 606 | 4/2003 |
| EP | 854304 | 7/1998 |
| EP | 1195537 | 4/2002 |
| EP | 1236936 | 9/2002 |
| EP | 1482195 | 12/2004 |
| GB | 14688 | 5/1916 |
| GB | 774824 | 5/1957 |
| JP | 60184721 | 9/1985 |
| JP | 10 089377 | 4/1998 |

OTHER PUBLICATIONS

Office Action of Related U.S. Appl. No. 11/212,473, May 22, 2007, 11 pages.

\* cited by examiner

WET CLUTCH, IN PARTICULAR DCT CLUTCH

DESCRIPTION

The present invention concerns a hydraulic double clutch. Such a clutch is known from EP 1 195 537 B1.

Such wet clutches, in particular DCT clutches, need a system to open the clutch. Most often a return spring, as in the case of EP 1 195 537, is used.

By pressurizing the activation chamber a force acts on the piston which compresses the plates of the clutch pack. The pressure inside the activation chamber is a combination of the applied static pressure and the dynamic pressure resulting from the centrifugal forces acting on the rotating oil mass. When the clutch needs to be opened the static oil pressure is put to zero but the dynamic pressure is still present. For fast rotating clutches this pressure is high enough to transmit a considerable torque.

In order to remove the force on the clutch pack one or more of the following features are applied:

a balancing chamber being disposed opposite to the activation chamber of the clutch piston rotates with the same speed as the piston and is filled with oil. It has normally more or less the same diameter as the activation chamber. The dynamic pressure of the balancing chamber counteracts the dynamic pressure of the activation chamber. When the activation and balancing chambers have the same dimensions the net force on the piston is zero. To create a clearance between the plates an additional force is needed high enough to overcome the friction of the seals. This can be realized by putting static pressure in the balancing chamber or by return springs.

A second option is the pressurizing of the balancing room. Putting a static pressure in the balancing room is also an effective way to move the piston away from the clutch pack. This solution, however, is mostly not used because of the additional cost created in the hydraulics.

Finally, as an inexpensive solution, a return spring can be provided pushing the piston away from the clutch pack.

All these solutions have a common disadvantage as they force the piston back to its end stop but they do not actively separate the clutch plates from each other.

The dragging of a clutch is the torque transmitted by the clutch when it is in the open position (this is when no static pressure is applied to the activation chamber). In order to optimize the efficiency of the driveline the dragging must be as low as possible. In particular for a Double Clutch transmission this dragging must be lower than the usual one because a synchronizer can only work properly when the dragging of the corresponding clutch is low.

Even when the piston is put against its end stop the clutch plates can position themselves freely in the available space. Researches within the scope of the present invention revealed that the plates sometimes tend to stick together or that sometimes plates tilt. In such a case the contacting plates create drag torque.

After removal of the static pressure it lasts a while until the clutch torque is dropped to its ultimate drag level because the clutch plates need some time to separate from each other. For fast shifting, especially in sports cars, it is required that the torque drops immediately after clutch pressure removal in order to be able to shift the gear.

It is, therefore an object underlying the present invention to provide a hydraulic double clutch that is able to reduce the number and the diameter of the piston rings as far as possible to keep the mechanical friction and the cost low nevertheless providing adequate balancing performance.

The solution of this object is achieved by the features embodiments of the present invention.

According to the present invention, in order to obtain an even distribution of the clearance, disc springs are put between the clutch plates so that the dragging of the clutch according to the present invention is eliminated or only minimal as the gaps between the plates are evenly distributed.

According to the present invention, the disc springs are in contact only with parts rotating at the same speed. They are also designed and tolerated in this way that the difference in force between the springs induces a difference in clearance so that the smallest clearance is still larger than the minimum acceptable gap. The disc spring upper and lower plane are also sufficiently parallel in order to keep the clutch plates sufficiently parallel to each other.

The dependent claims contain advantageous embodiments of the present invention.

Figure 2:
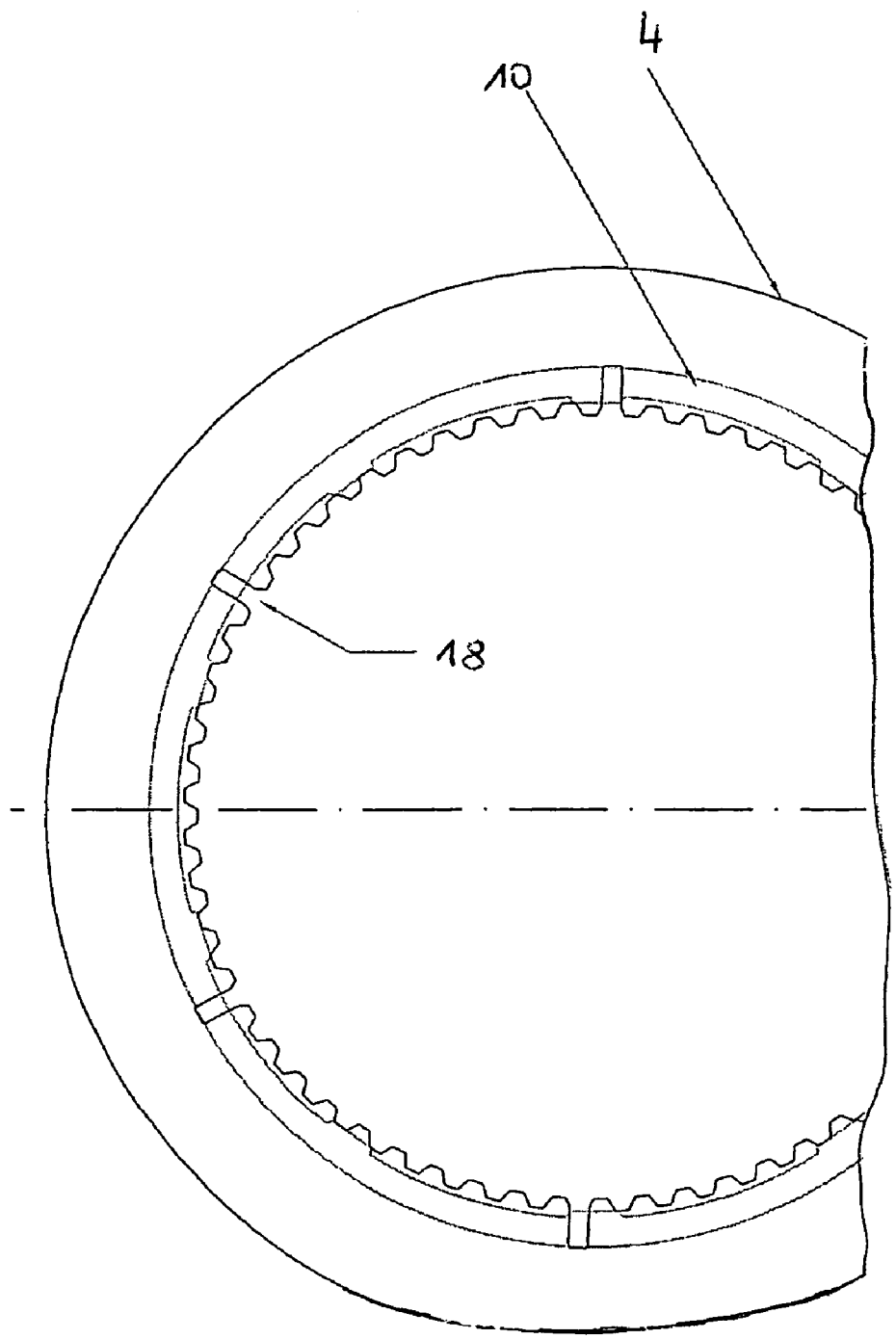

Further features and advantages of the present application will become more apparent from the following description of the drawings, in which FIG. 1 shows a schematically simplified illustration of a wet clutch in the form of a DCT clutch according to the present invention, and FIG. 2 a front elevational view of a steel plate and a disc spring used in the clutch according to FIG. 1.

FIG. 1 depicts a wet clutch 1 for a transmission of an engine, the transmission having an outer shaft and a concentrically arranged inner shaft comprising a stationary stator 22; a clutch housing 26 having a drive can driven by the engine; a first hydraulically activated clutch including a first clutch pack 2 driving an inner drum connected to the outer shaft; a second hydraulically activated clutch including a second clutch pack 3 driving an outer drum connected to the inner shaft; a central hub 12 connected to the clutch housing and having a web separating the juxtaposed clutch packs; a first piston-cylinder unit including a first clutch piston 8 being activated by a first hydraulic activation chamber 14 disposed between a first piston cylinder 30 and one side of the first clutch piston 8 acting on the first clutch pack 2; a second piston-cylinder unit including a second clutch piston 9 being activated by a second hydraulic activation chamber 17 disposed between a second piston cylinder 34 and one side of the second clutch piston 9 acting on the second clutch pack 3 a first balancing chamber 15 disposed on the other side of the first clutch piston 2; and a second balancing chamber 16 disposed on the other side of the second clutch piston 9 wherein the first and the second balancing chambers are fluidly connected to each other via a distribution hole 42; and piston rings 38 that are disposed inside the piston-cylinder units at the smallest possible diameter thereof.

FIG. 1 depicts a wet clutch 1 according to the present invention. In the present case, this wet clutch 1 is a DCT clutch that comprises two juxtaposed clutch packs 2 and 3. The clutch packs 2 and 3 comprise a plurality of steel plates 4 and 5, respectively. However, the present invention also encompasses a clutch with just one clutch pack.

Moreover, each clutch pack 2 and 3 has a plurality of friction plates 6 and 7, respectively that are disposed between the steel plates 4 and 5, respectively. In FIG. 1, only one of the steel plates and the friction plates has been identified by reference numerals 4, 5, 6, 7, respectively. According to the illustrated embodiments six steel plates and six friction plates are provided. Of course, it is within the scope of the present application, to provide a different number of friction and steel plates.

The clutch 1, furthermore, comprises a clutch piston 8 and 9, respectively acting on the respective clutch pack 2 and 3, respectively.

Next to each clutch piston 8 and 9 an activation chamber 14 and 17, respectively and a balancing chamber 15 and 16, respectively, is disposed.

The clutch packs 2 and 3 are separated by a central hub 12.

Moreover, a drive can 13 that is connected to an engine (not shown) is provided.

As can be clearly seen from FIG. 1 each clutch pack 2 and 3 comprises disc springs 10 and 11, respectively (according to the illustrated embodiment six disc springs 10 and five disc springs 11) that are disposed between the respective steel plates 4 and 5. Moreover, one disc spring is disposed between the central hub 12 and the neighboring steel plate 10 and 11, respectively.

Of course, the wet clutch 1 also comprises the commonly known other parts of such a type of clutch that, however, are not described in detail as they can be configured according to known clutches as the one known from EP 1 195 537. For the sake of completeness the entire disclosure of this document is incorporated into the disclosure of the present application by way of explicit reference.

In the following the function of the clutch according to the present invention is explained in detail:

The engine drives the central hub 12 via the drive can 13. The central hub 12 drives, in this configuration, the steel plates 4 and 5, respectively. Swapping steel plates and friction plates are principally also possible but need some more practical design qualifications to avoid that the springs would come into contact with parts rotating at different speeds.

When the clutch piston 8 and 9, respectively is activated by pressurizing the respective activation chamber 14 and 17, the corresponding clutch pack 2 and 3, respectively is pressed together. Also the respective disc springs 10 and 11 get compressed.

The clutch 1 must open by removing the static pressure from the activation chamber 14 and 17, respectively. The force on the piston 8 and 9, respectively due to the dynamic pressure of the balancing chamber 15 and 16, respectively is at least equal to the dynamic force of the activation chamber 14 and 17.

The disc springs 10 or 11 push the steel plates 4 and 5, respectively apart and move the respective clutch piston 8 or 9 in its respective end position. The friction plates 6 or 7 rotate now freely between the steel plates 4 and 5, respectively. The result is that the dragging of the clutch 1 disappears immediately after releasing the static clutch pressure.

FIG. 2 shows one steel plate 4 and one disc spring 10. The steel plate 4 comprises at least one, preferably a plurality of slots 18 that allow the lube oil to pass the disc spring 10 and get between the friction and steel plates for cooling purposes. FIG. 2 only shows one steel plate 4 but, of course, all the steel plates 4 and 5 of the respective clutch packs 2 and 3 comprise such slots 18.

The disk springs shown here are slotted disc springs. Normal disc springs without slots can be also used.

LIST OF REFERENCE SIGNS

1 Wet clutch, in particular DCT clutch
2,3 Clutch packs
4,5 Steel plates
6,7 Friction plates
8,9 Clutch pistons
10, 11 Disc springs
12 Central hub
13 Drive can
14, 17 Activation-chambers
15, 16 Balancing chambers
18 Slots
22 Stator
26 Clutch Housing
30 First Piston Cylinder
34 Second Piston Cylinder
38 Sealing Ring
42 Distribution Hole

The invention claimed is:

1. Wet clutch, comprising:
   a stationary stator;
   a clutch housing having a drive can driven by an engine;
   a first hydraulically activated clutch including a first clutch pack driving an inner drum connected to an outer shaft, wherein the first clutch pack includes;
      a plurality of steel plates, and
      a plurality of friction plates being positioned between the steel plates and at least one first clutch piston acting on the first clutch pack wherein
   disc springs are positioned between the steel plates, the disc springs having an outer conical surface spaced from an inner conical surface;
   a second hydraulically activated clutch including a second clutch pack driving an outer drum connected to an inner shaft, wherein the second clutch pack includes:
      a plurality of steel plates, and
      a plurality of friction plates being positioned between the steel plates and at least one second clutch piston acting on the second clutch pack wherein
   disc springs are positioned between the steel plates, the disc springs having an outer conical surface spaced from an inner conical surface;
   a central hub connected to the clutch housing and having a web separating the juxtaposed first and second clutch packs;
   a first piston-cylinder unit including the first clutch piston being activated by a first hydraulic activation chamber positioned between a first cylinder and one side of the first clutch piston acting on the first clutch pack;
   a second piston-cylinder unit including the second clutch piston being activated by a second hydraulic activation chamber positioned between a second cylinder and one side of the second clutch piston acting on the second clutch pack;
   balancing means including:
      a first balancing chamber positioned on the other side of the first clutch piston; and
      a second balancing chamber positioned on the other side of the second clutch piston;
   wherein the first and the second balancing chambers are fluidly connected to each other by distribution holes in the central hub to form a common balancing room and to connect to a common balancing oil passage in the stator; and
   wherein sealing rings are positioned between the stator and the piston cylinder units radially inside the piston-cylinder units at the smallest possible diameter thereof.

2. The clutch according to claim 1, wherein the steel plates comprise slots for guiding lube oil between the steel plates and the friction plates.

3. The clutch according to claim 1, wherein the sealing rings are positioned in line between the stator and the rotating clutches.

4. The clutch according to claim 3, wherein there are provided six sealing rings.

5. The clutch according to claim 1, wherein the first clutch piston and the second clutch piston is provided with a separate lubrication oil passage.

* * * * *